US008214237B2

(12) United States Patent
Doris

(10) Patent No.: US 8,214,237 B2
(45) Date of Patent: *Jul. 3, 2012

(54) METHODS AND APPARATUS FOR RESOURCE ALLOCATION IN COMPUTER ARCHITECTURES

(75) Inventor: Tom F. Doris, Limerick (IE)

(73) Assignee: Intel Corporation, Santa Clara, CA (US)

( * ) Notice: Subject to any disclaimer, the term of this patent is extended or adjusted under 35 U.S.C. 154(b) by 1320 days.

This patent is subject to a terminal disclaimer.

(21) Appl. No.: 11/836,685

(22) Filed: Aug. 9, 2007

(65) Prior Publication Data

US 2007/0276718 A1 Nov. 29, 2007

Related U.S. Application Data

(63) Continuation of application No. 10/796,550, filed on Mar. 9, 2004, now Pat. No. 7,272,596.

(51) Int. Cl.
*G06Q 10/00* (2012.01)
(52) U.S. Cl. ............................. 705/7.11; 707/3; 709/226
(58) Field of Classification Search .................... 705/11; 707/3; 709/226
See application file for complete search history.

(56) References Cited

U.S. PATENT DOCUMENTS

| | | | | | |
|---|---|---|---|---|---|
| 5,343,388 | A | * | 8/1994 | Wedelin ............................ | 705/8 |
| 5,504,887 | A | * | 4/1996 | Malhotra et al. .............. | 707/205 |
| 5,546,542 | A | * | 8/1996 | Cosares et al. ................ | 709/241 |
| 5,940,816 | A | * | 8/1999 | Fuhrer et al. .................... | 706/13 |
| 6,092,065 | A | * | 7/2000 | Floratos et al. ................... | 707/6 |
| 2002/0188489 | A1 | * | 12/2002 | Cheng et al. ...................... | 705/8 |
| 2003/0061262 | A1 | | 3/2003 | Hahn et al. | |
| 2003/0099014 | A1 | * | 5/2003 | Egner et al. ................... | 359/124 |
| 2003/0149685 | A1 | | 8/2003 | Trossman et al. | |
| 2005/0198102 | A1 | | 9/2005 | Hahn et al. | |

OTHER PUBLICATIONS

MOCSYN: Multi-objective core-based single-chip system synthesis [PDF] from psu.edu RP Dick . . . —date, 1999—computer.org.*
"Parallel biased search for combinatorial optimization: genetic algorithms and TABU" [PDF] from unitn.it R Battiti . . . —Microprocessors and Microsystems, 1992—Elsevier.*
An O (1) time algorithms for computing histogram and Hough transform on a cross-bridge reconfigurable array of processors TW Kao, SJ Horng . . . —Systems, Man and Cybernetics . . . , 1995—ieeexplore.ieee.org.*
"Architecture synthesis and partitioning of real-time systems: A comparison of three heuristic search strategies", [PDF] from psu.edu J Axelsson—codes, 1997—computer.org.*
Intel Technology Journal, Network Processors, The Next Generation of Intel IXP Network Processor,vol. 06, Issue 03, pp. 6-18, Copyright Intel Corporation 2002.
"Introduction to the Auto-Partitioning Programming Model," Accelerating Custom Application Development on Intel IXP2XXX Network Processors, 10 pages, 2003.

* cited by examiner

*Primary Examiner* — Jonathan G Sterrett
(74) *Attorney, Agent, or Firm* — Marshall, Gerstein & Borun LLP

(57) ABSTRACT

Methods and apparatuses for searching for an optimal resource allocation configuration are disclosed. First and second configurations for allocating resources are generated, each having first and second degrees of optimization, respectively. The second configuration is based on a variation of the first configuration. The second configuration is rejected if the first degree of optimization represents a more optimal configuration than the second degree of optimization based on a first probability that the first configuration is a global optimum configuration. The second configuration is accepted if the first degree of optimization represents a more optimization configuration than the second degree of optimization based on a second probability that the first configuration does not comprise the global optimum configuration.

20 Claims, 2 Drawing Sheets

METHODS AND APPARATUS FOR RESOURCE ALLOCATION IN COMPUTER ARCHITECTURES

This patent is a continuation of U.S. Ser. No. 10/796,550, filed Mar. 9, 2004, the contents of which are expressly incorporated by reference herein.

FIELD OF THE TECHNOLOGY

The application relates generally to resource allocation, and, more particularly, to searching and determining an optimal resource allocation configuration.

BACKGROUND

When designing a software application, a programmer decomposes the application into a set of tasks and a group of data structures for those tasks to operate on. The programmer further attempts to find an assignment of tasks to processing cores and an assignment of data structures to data stores. In assigning an operation to a resource, or otherwise determining a resource allocation configuration, the programmer must be sure not to exceed the capacity of any processing core, bus or storage unit. Generally, an optimal configuration for allocating resources will generally balance the load evenly across tlhe available resources. Balancing a load across multiple resources (e.g., balancing the headroom across multiple resources) makes large restructuring requirements less likely should small changes be subsequently required. However, due to the number of potential configurations for any non-trivial system, it is virtually impossible to create an optimal configuration for allocating resources manually (e.g., having the programmer manually determine the assignments). This may be especially true with regard to parallel architectures having multiple resources of a particular type (e.g., multiple processing cores, multiple data stores, etc.).

Automatically allocating resources to the tasks and data structures of the software application in an optimal manner relieves the programmer of this burden. Finding an optimal configuration for allocating operations among the available resources involves searching for such an optimal configuration through all potential configurations (i.e., the search space). For non-trivial systems, such as parallel architectures found in network processors, a conventional brute force search method that generates and evaluates every conceivable configuration could be particularly inefficient. For example, the number of potential configurations for assigning twenty tasks to sixteen microengines yields $16^{20}$ potential configurations. Using a brute force search method at a rate of one-hundred thousand configurations per second, it would take hundreds of millions of years to search through and evaluate all potential configurations to provide an exhaustive search for an optimal configuration.

Although the brute force search method may be augmented with termination criteria such as finding the first acceptable configuration, failure to improve the search results within a predetermined number of configurations or evaluating a predetermined maximum number of configurations. However, this may cause the brute force search to terminate prematurely and may not result in an optimal configuration compared with the remaining unsearched configurations. Efforts to make a brute force search method efficient may result in less than optimal configurations.

DETAILED DESCRIPTION OF THE EXAMPLES

Figure 1:
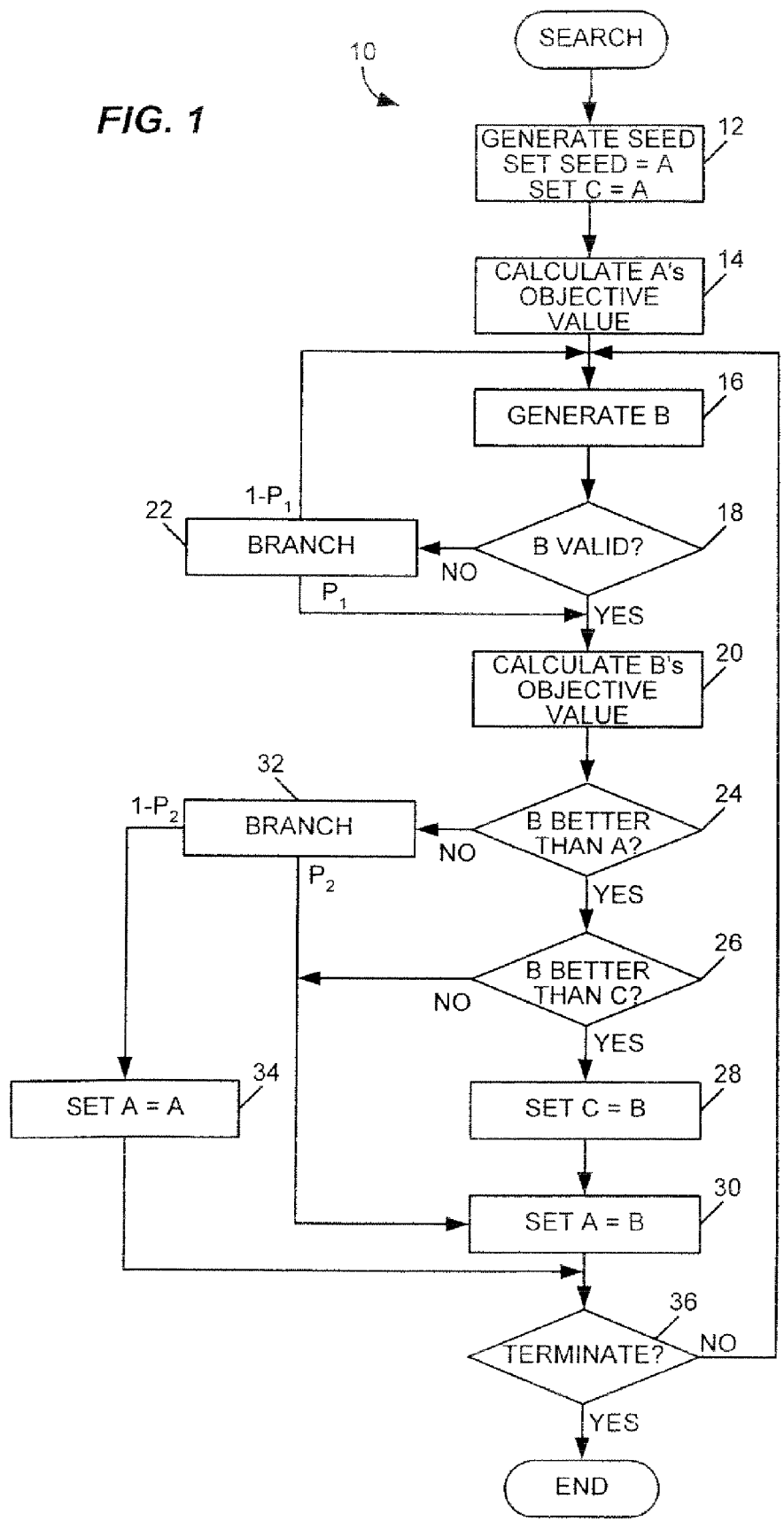
FIG. 1 is a flowchart of an example of a search routine for finding an optimal configuration for allocating resources.

An example of a search routine 10 is shown, generally in FIG. 1. Although the search routine 10 is particularly well suited for searching for an optimal configuration for allocating resources found in a parallel architecture, or the like, the teachings of the instant application are not limited to any particular type of architecture or to any particular software application intended to be executed on a parallel architecture. On the contrary, the teachings of the application can be employed with virtually any computer architecture and software application to be executed on the computer. Thus, although the search routine 10 will be described below primarily in relation to assigning tasks to microengines and data structures to data stores in a parallel architecture, the apparatus and method could likewise be used with any type of architecture, software application, resource, resource allocation, etc.

A parallel computer architecture, such as a network processor, may contain multiple, independently operated processing units. The multiple processing units may share common resources such as bus access and external data stores. Each individual processing unit, or microengine, may be operationally identical to other processing units. As such, there are many ways of partitioning a software application across the processing units (i.e., allocating resources to the application operations). Each configuration may result in a different loading pattern on the resources of a processing chip comprising the multiple processing units. An optimal configuration for allocating resources may have a positive impact on the performance of the software application.

Although the number of potential configurations may vary depending on the number of operations to be allocated and the number of resources to be utilized, for parallel architectures and other computer architectures having multiple resources. an optimal configuration or configurations may be hidden among a large search space comprising a large number of potential configurations for allocating resources. For example, the number of potential configurations for allocating M processing units to N tasks may be expressed as $M^N$. With M processing units, such as a microengine, each task in tan application is assigned to a microengine in the range of 0 to (M−1), Therefore, assigning, N tasks is equivalent to picking an N digit number in base M. For relatively few tasks (e.g., 4) and processing units (e.g., 3), the number of potential configurations for allocating the tasks among the processing units is relatively small (e.g., 81). The assignments are thereby characterized as four digit numbers in base 3, such as 0000 (all tasks being executed on microengine 0) or 0122 (task 1 executed on microengine 0, task 2 executed on microengine 1, tasks 3 and 4 executed on microengine 2), etc.

The task may be characterized by tie number of processing cycles tie task will use, and may be further characterized in terms of the amount of load it will place on one or more buses due to memory accesses. Similarly, data structures may be stored in a variety of data stores, such as DRAM channels, scratch channels, SRAM channels, or other memory types and memory channels. Each data store generally has a limited amount of access bandwidth. The data structures are thereby assigned to the data stores in a configuration that does not exceed the access bandwidth for any given store. Data structures may be characterized by their size and the amount of read and write accesses that are made to the data structures.

Generally, the search routine 10 includes variants of, or aspects of Stochastic Genetic Algorithms (STGA) and Constraint Satisfaction (CSAT) methods. The search routine 10 may be designed to search for the global optimum configuration for allocating resources among all potential configurations (i.e., the search space). However, the search routine 10 may be designed to search for an optimal configuration, which may not necessarily be the global optimum configuration. In some cases, an optimal configuration is the most optimal configuration among a given subset of the search space, or may be close to the global optimum configuration or local optimum configuration.

Genetic algorithms, or other evolutionary algorithms, generate new candidate solutions to a problem by modifying previous or existing candidate solutions in a random manner (i.e., mutation). The resulting mutated solution is evaluated according to an objective criteria to determine a measurement of how well the solution solves a particular problem. The measurement may be referred to as "fitness." For example, with regards to searching for an optimal configuration, a candidate configuration may be modified in a random manner (i.e., mutated) with the resulting configuration evaluated to determine how well the configuration allocates resources. The genetic algorithm may result in an optimal configuration that is considered the best among the configurations evaluated. The best or most optimal configuration may or may not be the global optimum configuration.

CSAT methods solve a problem that can be expressed in terms of a set of constraints. Typically, these expressions are in the form of linear equations. For example, a candidate configuration may be evaluated according to a set of minimum configuration constraints or threshold, imposed by resource limitations.

Although the search routine 10 shown in FIG. 1 will be described with regard to searching for an optimal configuration for allocating tasks to microengines and/or data structures to data stores, the search routine 10 may be adapted to be applied to any allocation problem where a set of resources is to be assigned to a group of operations that utilizes the resources. For example, the search routine 10 described herein is applicable to both the allocation of tasks to microengines and of data structures to data stores, as will be described further below.

The search routine 10 begins at block 12 where a seed configuration is established. The seed configuration is utilized to bootstrap the search routine 10. The seed configuration may be a simple, random assignment of resources to operations. However, the seed configuration may also have a basis for its assignments. For example, a seed configuration may be chosen based on past experiences indicating a high probability that the seed configuration maybe close to an optimal configuration. The seed configuration may also be chosen as the simplest configuration (e.g., all tasks running on microenigine 0)as a configuration distributing equal number of tasks on each microengine, or for any other criteria. The seed configuration may be determined by the search routine 10 or by the programmer. The seed configuration is set as the current configuration, A, and the most optimally known configuration, C, is set as the current configuration A. Because the search routine 10 has only just initialized at block 12, the current configuration A is considered the most optimal configuration found at that particular time.

At block 14, the search routine 10 calculates an objective value for the current configuration A, and stores the objective value in a memory. The objective value may be a number that characterizes how well a particular configuration allocates resources. in other words, the objective value is considered to be a characterization of the fitness, or degree of optimization, of assigning operations to resources based on the current configuration A. The relationship between a configuration and its objective value indicates the balance of the load among the resources. For example, in allocating microengines, the standard deviation is determined for the percentage utilization of an internal bus bandwidth across clusters of microengines. The objective value may be the sum of those standard deviations. For allocating data stores, the standard deviation is determined for the percentage utilization, percentage read bandwidth utilization and percentage write bandwidth utilization across multiple memory channels. The objective value for a configuration of data stores to data structures may be the sum of the standard deviation for each of the capacity utilization, read bandwidth utilization, and write bandwidth utilization across the memory channels.

At block 16, the search routine 10 generates a new configuration B based on the current configuration A. The process at block 16 follows that of a genetic algorithm or other evolutionary algorithm. In other words, the new configuration 13 is generated as a variation of the current configuration A. A variation of the current configuration A may be a random or stochastic variation generated according to a genetic operator. By generating a new configuration B based on the current configuration A, the search routine 10 selects new configurations as part of a methodical search throughout the entire search space without evaluating every conceivable configuration. In other words, the search routine 10 progressively searches through the search space by sampling various configurations.

To generate a new configuration B for data store allocation, a data structure is chosen at random (or pseudo-randomly) and moved to a new channel, provided that the chosen channel has sufficient storage and bandwidth overhead. To generate a new configuration B for microengine allocation, a stage is chosen at random (or pseudo-randomly). Generally, chains of next neighbor relationships exist, which should be preserved because the likelihood of reconstructing a broken next neighbor chain through random permutation is generally low. If the randomly chosen stage is not part of a chain, the search routine 10 chooses another stage that is also not part of a chain and swaps it for the randomly chosen stage. If the randomly chosen stage is part of a chain, the new configuration B is generated by moving the entire chain up or down one stage, provided the chain is not adjacent to other chains. If the randomly chosen stage is part of a chain, and the chain is adjacent to another chain, the chain, including the randomly chosen stage, is moved up or down by the number of stages in the adjacent chain.

Once the new configuration B has been generated, the search routine may determine whether the new configuration B meets minimum configuration constraints at block 18. The search routine 10 determines whether the new configuration 13 is a valid configuration based on a constraint satisfaction (CSAT) method, as mentioned above. For example, when allocating microengines, a minimum configuration constraint, or threshold. may be the capacity of each internal bus and next neighbor chains, causing the search routine 10 at block 18 to insure that the bandwidth utilization of each internal bus is within its capacity an-d that all next-neighbor chains are intact. When allocating data stores, the configuration constraints may include the storage capacity and read/write bandwidth of each data store, causing the search routine 10 to verify that the storage capacity and read/write bandwidth of each data store has not been exceeded. The particular constraints for a given configuration may depend on the particular resource and/or operation that is the subject of the search routine 10.

If the new configuration B meets the minimum configuration constraints, as determined at block 18, the search routine 10 passes control to block 20 to calculate the objective value of the new configuration B. If the minimum constraints are not met, the search routine 10 passes control to block 22. At block 22, the search routine 10 determines whether to accept or reject the new configuration B according to a probability $P_1$. For example, the majority of new configurations B that do not meet the minimum configuration constraints or thresholds may be rejected according to a probability $(1-P_1)$ however, according to the probability $P_1$, the search routine 10 may accept the new configuration B despite the fact that it does not meet the minimum configuration constraints. As will be explained further below, it is sometimes desirable to keep a new configuration B that does not meet the minimum constraints in order to evolve through a number of configurations that do not meet the constraints, yet gradually improve their quality. In other words, according to a probability $P_1$, a search routine 10 takes into account that, although the new configuration B being evaluated does not meet minimum constraints, the new configuration B may be used to eventually discover a configuration that does meet the minimum constraints. In some cases, no configuration will meet the minimum configuration constraints or thresholds, yet it may still be desirable to return the best possible configuration encountered by the search routine 10.

The probability $P_1$ may be set to any desired value and may be variable to suit the morphology of the search space. For example, the probability $P_1$ may be determined by the programmer, or the probability $P_1$ may be initially set at a default value which varies as the search routine 10 performs numerous iterations. In one example, the probability $P_1$ varies according to the number of iterations performed by the search routine 10, such that the probability $P_1$ may decrease in value as fewer and fewer potential configurations remain within the search space. In another example, the probability $P_1$ varies according to previously encountered configurations, such that, despite failing to meet the minimum configuration constraints, the new configuration B is considered an improvement over the current configuration A, and the probability P may be increased to indicate a higher probability that a valid configuration may eventually be found based on this perceived trend of improving. If the search routine 10 rejects the new configuration B according to the probability $(1-P_1)$, control returns to block 16 to generate another new configuration B based on the current configuration A. If the search routine 10 at block 22 accepts the new configuration B, based on the probability P that it may ultimately yield a valid configuration, control passes to block 20 where the search routine 10 calculates the objective value of the new configuration B.

At block 20, the search routine 10 calculates the objective value for the new configuration B. As explained above, the objective value may characterize how well the new configuration B allocates resources. In other words, the objective value may indicate the fitness or degree of optimization for the new configuration B, as determined at block 20. As also explained above, the objective value may be dependent on the particular operations and/or resources being allocated.

At block 24, the search routine 10 determines whether the new configuration B is better than the current configuration A by comparing their respective objective values. In otter words, the search routine 10 determines whether or not the new configuration B has a better degree of optimization or fitness than the current configuration A. Because the objective value may be determined by the sum of the standard deviations of the utilization of a resource, a lower objective value generally indicates the configuration is closer to an optimal configuration than a con figuration having a higher objective value.

If the new configuration B is determined to be better than the current configuration A, the search routine 10 passes control to block 26 where the search routine 10 determines whether the new configuration B is better than the most optimally known configuration C. The determination made at block 26 may be based on the same criteria as tie determination made at block 24. If the new configuration B is better than the most optimally known configuration C control passes to block 28 where the most optimally known configuration C is updated and redefined with the parameters of the new configuration B. In other words, because the new configuration B is determined to be better than the most optimally known configuration C, the new configuration B now becomes the most optimally known configuration C. Control then passes to block 30 where the current configuration A is updated and redefined with the parameters of the new configuration B. That is, the search routine 10 will now use the new configuration B as the current configuration A to generate further configurations. If, however, the search routine 10 determines at block 26 that the most optimally known configuration C is better than the new configuration B, control passes directly to block 30 where the current configuration A is updated and redefined with the parameters of the new configuration B, and the most optimally known configuration C remains unchanged.

Referring again to block 24, if the search routine 10 determines that the current configuration A is better than the new configuration B, control passes to block 32 where the search routine 10 decides whether or not to keep the new configuration B, despite the fact that the new configuration B is not an improvement over the current configuration A. At block 32, the search routine 10 may reject the new configuration B according to a probability $1-P_2$ that a more optimal configuration based on the new configuration B may not exist. The search routine 10 may also accept the new configuration B according to a probability $P_2$ that the configurations based on the new configuration B may yield more optimal configurations than the current configuration A (i.e., more optimal configurations may exist), despite the fact that the new configuration B is not considered an improvement. In effect, the search routine 10 may be considered a hill-climbing search routine, and the determination at block 32 allows the search routine 10 to avoid being trapped inside a local minima (i.e., region of search space in which only less optimal configurations exist nearby, but in which the local optima is a much less optimal configuration than the global optimum configuration). Instead, the search routine 10 is sometimes forced to take a chance that a more optimal configuration may exist outside a local minima according to the probability $P_2$.

The probability $P_2$, at block 32, may be based on the probability $P_1$ at block 22, described above. For example, the probability $P_2$ at block 32 may be a variable probability which varies according to the probability $P_1$ utilized at block 18. In another example, the probability $P_2$ utilized at block 32 maybe different than the probability $P_1$ utilized at block 18. For example, the probability $P_1$ may be based on the probability of encountering a configuration that meets the minimum configuration constraints or thresholds. On the other hand, the probability $P_2$ may be based on the probability that a configuration better than the current configuration A exists within the remaining search space, and that the new configuration B may be used to generate further configurations that will eventually lead to a more optimal configuration than the current configuration A.

Once the new configuration B has been evaluated to determine whether or not to update tie current configuration A and the most optimally known configuration C, the search routine 10 decides whether to continue searching or to terminate the search at block 36. The determination at block 36 may be based on a set of termination criteria which may be set by the programmer. For example, the search routine 10 may be terminated if the degree of optimization (e.g., the objective value) of the most optimally known configuration C is equal to or better than what is required. The search routine 10 may also be terminated if the most optimally known configuration C has not improved within a predetermined number of iterations of the search routine 10. The search routine 10 may also be terminated at block 36 if the total number of iterations has exceeded a maximum allowable number of iterations. The search routine 10 may thus return an optimal configuration even if the configuration is not the global optimum or best possible configuration. Each of the above criteria may be specified by the programmer, and together may be used to determine the depth of the search for an optimal configuration. For example, the above criteria may be set such that the search routine 10 will terminate and return the first configuration it encounters that meets the configuration constraints or other minimum threshold requirements. In other words, an optimal configuration may be any configuration that meets a minimum set of requirements, and the first such configuration found is returned as the optimal configuration. In other cases, the termination criteria may be set such that the search routine 10 will likely return a global optimal configuration as an optimal configuration.

If the termination criteria is satisfied, as determined at block 36, the search routine 10 returns the most optimally known configuration C as the optimal configuration for allocating resources. Otherwise, control may be returned to block 16, and the search routine 10 generates a new configuration B based on the current configuration A as defined at either block 30 or block 34. in effect the search routine 10 continues generating new configurations based on previous configurations to progressively search through the search space of all potential configurations for allocating resources. The search routine 10 may include safeguards to avoid being trapped in a local minima, and to further avoid being trapped due to configuration constraints.

Figure 2:
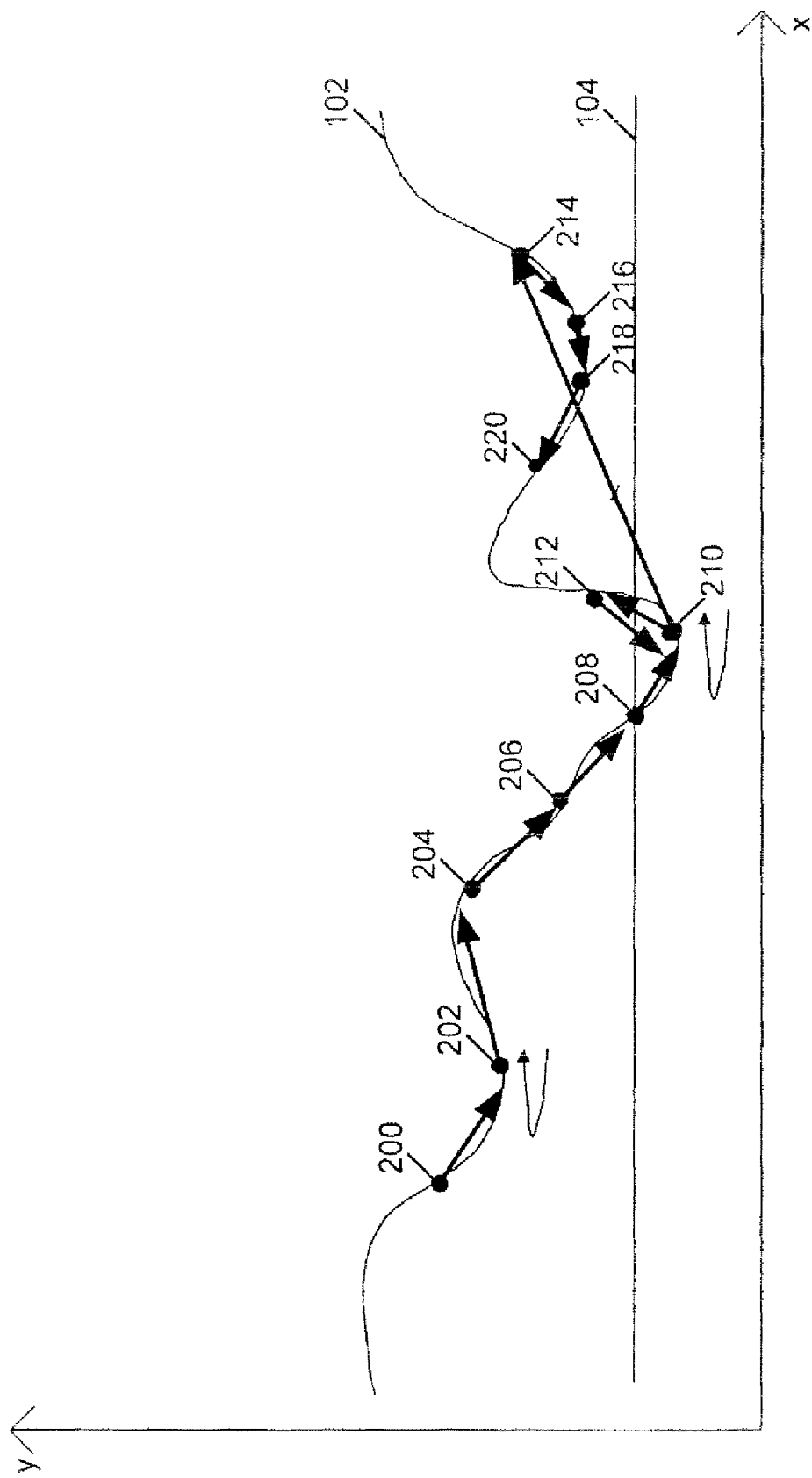
FIG. 2 is a graphical representation of the operation of the search routine of FIG. 1.

FIG. 2 is a diagram depicting the performance of the search routine 10 through a search space of potential configurations for allocating resources. The graph of FIG. 2 is shown for exemplary purposes only in explaining the performance of the search routine 10 within a simple search space, and should not be used to construe the particular performance of the search routine 10 for every scenario. The performance of the search routine 10 may vary depending on the configuration constraints, the criteria established for termination, the operations or resources being allocated and/or the particular configurations that may exist within the search space.

Referring to FIG. 2, every potential configuration for allocating resources is represented along an X axis. The degree of optimization for each of the configurations is plotted as an objective value along the Y axis, resulting in a two-dimensional curve 102. Generally, a graph of the objective value for all possible configurations be represented as a three dimensional surface. However, the resulting surface may be multi-dimensional, and the number of dimensions may be dependent on the number of resources being taken into account. As described above, each potential configuration for allocating resources is represented as $M^N$, where N is the number of operations and M is the number of resources to be allocated. As such, each configuration may be presented along a single X axis, and the objective value surface is represented in two dimensions, with each possible configuration described by an N digit number in base M along the X axis, and the objective value for each configuration plotted as the height of the curve 102. As described above, the lower the objective value, the better tie degree of optimization for a configuration.

Referring to FIG. 2, the search routine 10 randomly chooses a starting, or seed, configuration 200. During the initial iteration of the search routine 10, the seed configuration 200 is set as the current configuration A and as the most optimally known configuration C. New configurations B are generated based on this seed configuration 200. In terms of the search space shown above, configurations close to the starting configuration 200 are generated and evaluated according to the search routine 10. If the new configuration B is found to be better than the seed configuration 200, the search routine 10 updates the current configuration A with the new configuration B. As seen in FIG. 2, a better configuration will have a lower objective value than the current configuration. As indicated by the arrow extending from the starting configuration 200, the search routine 10 follows the slope of the curvature generating, evaluating and updating the current configurations with new, more optimal configurations. The most optimally known configuration C is redefined accordingly along this downward slope Based on the search space shown in FIG. 2, the search routine 10 may encounter a local minima at configuration 202. The configuration 202 is considered to be the most optimally known configuration in the region, and sampling nearby configurations based on the current configuration 202 will not cause a more optimal configuration to be found (e.g., a configuration with a lower objective value). The search routine 10 samples new configurations B located near configuration 202, but generally rejects them because they do not improve on the current configuration A. Eventually, according to a probability $P_1$ that a better configuration exists, the search routine 10 discards the current configuration 202 in favor of a configuration 204 having a less optimal configuration (e.g., a higher objective value) than the current configuration 202.

Up to this point, the most optimally known configuration C is still the configuration 202 at the local minima. If the search routine 10 were to satisfy one or more of the termination criteria, the search routine 10 would return the configuration 202 as the best known configuration (e.g., the most optimal configuration found). For example, if the search routine 10 had not continued to the configuration 204, the search routine 10 may have terminated if it had not found a better configuration within a certain number of search iterations of the local minima at the current configuration 202. However, because of the probability $P_2$ that a better configuration may exist, this termination criteria may not be satisfied. It should be noted that the search routine 10 does not necessarily consider every configuration (e.g., all configurations between the seed configuration 200 and the configuration 202). Rather, the search routine 10 merely samples the configurations, thereby avoiding early termination from failure to improve within a set number of configurations of the most optimally known configuration C within a predetermined number of search iterations.

As further seen in FIG. 2. when configuration 204 is the current configuration A, the search routine 10 is on a downward slope approaching the global optimum of the search space. The search routine 10 may sample a few configurations near the current configuration 204 and almost immediately discover a configuration 206 having a better degree of optimization than the current configuration 204. Likewise, the search routine 10 may sample a few configurations near the (now current) configuration 206 and almost immediately find a more optimal configuration 208. Again, not every configuration is generated and evaluated. Rather, the search routine 10 samples a few configurations based on the current configuration A, such that each step in the search may actually ignore tens or hundreds of configurations. In other words, the search routine 10 follows the search space without generating and evaluating every conceivable configuration, based on the assumption that similar configurations generally have similar degrees of optimization and assume that anomalies (eg. sudden and extreme degrees of optimization) do not exist within these similar configurations.

Eventually, the search routine 10 descends the gradient into a global optimum configuration 210. The search routine 10 samples nearby configurations around the global optimum configuration 210. In this example, the search routine 10 samples a large number of configurations within a small search area around the global optimum configuration 10 to determine whether or not more optimal configurations exist nearby and confirm that the global optimum configuration 210 is the most optimal configuration. For example, the search routine 10 may generate a new configuration based on the configuration 208 that results in an optimal configuration, but which may not necessarily be the global optimum configuration 210. By sampling a large number of configurations near the optimal configuration, the search routine 10 eventually finds the global optimal configuration 210.

Unless a termination criteria has been reached, the search routine 10 continues to sample configurations around the global optimum configuration 210 to in the attempt to avoid becoming trapped in a particularly deep local minima. For example, based on the probability $P_2$ that a better configuration may yet exist, the search routine 10 generates and evaluates a new configuration 214 which has a worse degree of optimization than the global optimum configuration 210. In other words, the search routine 10 has not yet concluded that the most optimally known configuration as found at configuration 210 is actually the global optimum configuration. The search routine 10 eventually returns to the minima located at the global optimum configuration 210 from which it attempted to emerge. However, based on the probability $P_2$ that a better configuration may exist, the search routine eventually escapes from this minima and stochastically jumps to a new configuration 214, even though this configuration has a worse degree of optimization then the global optimum configuration 210. The search routine 10 eventually descends the gradient to a configuration 216, and eventually finds another local minima at a configuration 218. However, the configuration 218 is still not better than the most optimally known configuration (i.e., the global optimum configuration 210). The search routine 10 continues searching for a better configuration and eventually terminates at configuration 220 if one of the termination criteria has been satisfied (e.g., maximum number of configurations sampled, no better configuration discovered within a set number of iterations, etc.). The search routine 10 then returns the most optimally known configuration found during the search, in this case the global optimum configuration 210.

As noted above, the search routine 10 may be terminated for a variety of reasons based on a variety of criteria. For example, line 104 indicates a minimum configuration constraint (e.g., a maximum permissible objective value), such that the first configuration that meets this minimum causes the search routine 10 to terminate and return that configuration as an optimal configuration. Referring to FIG. 2, based on this termination criteria, the search routine 10 returns the configuration 208 and terminates the search. Even though the configuration 208 has a worse objective value than the global optimum configuration 210, the configuration 208 satisfies the resource allocation requirements and may be returned as an optimal resource allocation configuration.

If, however, the minimum configuration threshold as indicated by line 104 were set to an objective value lower than that of the global optimum configuration 210, the search routine 10 may proceed as indicated in FIG. 2, and return the global optimum configuration 210 as the most optimally known configuration, despite the fact that it does not meet the minimum configuration constraints. The search routine 10 is therefore capable of quickly and efficiently finding an optimal configuration within a search space that includes a large number of possible configurations. In many cases, the search routine 10 is capable of finding an optimal configuration close to the global optimum, and some cases finds the global optimum configuration.

By sampling configurations, as opposed to generating and evaluating every potential configuration, the search routine 10 may not necessarily find the global optimum configuration but rather finds an optimal configuration comparable to the global optimum configuration and suitable for the application's requirements and the resource limitations. In other cases, by sampling a large number of configurations around an optimal configuration, the search routine 10 may eventually find the global optimum configuration. This may be dependent on the particular termination criteria being utilized for the search routine 10, and may further be dependent on the shape and size of the search space (i.e., the number of possible configurations).

Various methods and apparatus have been described herein, which may be implemented as hardware, software or firmware. The methods and apparatus may further be implemented in one or more routines, which may reside on a machine-accessible medium. A machine-accessible medium may include any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.), as well as electrical, optical, acoustical or other form of propagated signals (e.g., carrier waves, infrared signals, digital signals, etc.); etc.

Although certain apparatus constructed in accordance with the teachings of the application have been described herein, the scope of coverage of this patent is not limited thereto. On the contrary, this patent covers all embodiments fairly falling within the scope of the appended claims either literally or under the doctrine of equivalents.

What is claimed is:
1. A method of searching for an optimal resource allocation configuration comprising:
generating, using a processor, a first configuration for allocating resources having a first degree of optimization;
generating, using the processor, a second configuration for allocating resources, wherein the second configuration is generated based on a variation of the first configuration, the second resource allocation configuration having a second degree of optimization;

determining, using the processor, if the second configuration meets minimum configuration restraints;
in response to a determination that the second configuration meets the minimum configuration restraints or that the second configuration does not meet the minimum configuration restraints but is to be kept, then;
rejecting, using the processor, the second configuration if the first degree of optimization represents a more optimal configuration than the second degree of optimization based on a first probability that the first configuration comprises a global optimum configuration for allocating resources; or
accepting, using the processor, the second configuration if the first degree of optimization represents a more optimal configuration than the second degree of optimization based on a second probability that the first configuration does not comprise the global optimum configuration for allocating resources.

2. The method of claim 1 further comprising accepting the second configuration if the second degree of optimization represents a more optimal configuration than the first degree of optimization.

3. The method of claim 1 further comprising:
comparing the second degree of optimization to a degree of optimization according to the most optimal configuration among previously generated configurations;
rejecting the second degree of optimization if the degree of optimization according to the most optimal configuration represents a more optimal configuration than the second degree of optimization; and
accepting the second degree of optimization if the second degree of optimization represents a more optimal configuration than the degree of optimization according to the most optimal configuration.

4. The method of claim 1 further comprising:
assigning an operation to a resource according to the first resource allocation configuration if the first degree of optimization represents a more optimal configuration than the second degree of optimization; and
assigning the operation to a resource according to the second resource allocation configuration if the second degree of optimization represents a more optimal configuration than the second degree of optimization.

5. The method of claim 4,
wherein the operation comprises an executable task; and
wherein the resource comprises a microengine.

6. The method of claim 4,
wherein the operation comprises a data structure; and
wherein the resource comprises a data store.

7. The method of claim 1, wherein generating a second configuration based on the first configuration comprises randomly modifying the first configuration.

8. The method of claim 1, wherein generating a second configuration comprises sampling one of a plurality of configurations for allocating resources, the plurality of configurations each comprising a variation of the first configuration.

9. The method of claim 1, wherein generating a second resource allocation configuration comprises modifying the first resource allocation configuration according to a genetic operator.

10. The method of claim 1 further comprising:
determining a value characterizing the utilization of resources according to a configuration for allocating resources, wherein a first value comprises the first degree of optimization, and a second value comprises the second degree of optimization.

11. The method of claim 10, wherein determining a value comprises:
determining a standard deviation of utilization for each resource in a configuration for allocating resources; and
determining the sum of the standard deviations of utilization for each resource in the configuration for allocating resources.

12. The method of claim 11, wherein determining the standard of deviations of utilization for each resource in the configuration comprises determining the standard deviations of percentage utilizations of bus bandwidth across a cluster of microengines.

13. The method of claim 11, wherein determining the standard of deviations of utilization for each resource in the configuration comprises:
determining the standard deviations of percentage capacity utilization across one or memory channels;
determining the standard deviations of percentage read bandwidth utilization across the one or memory channels; and
determining the standard deviations of percentage write bandwidth utilization across the one or memory channels.

14. The method of claim 10,
wherein rejecting the second configuration comprises rejecting the second configuration if the first value is lower than the second value based on the first probability that the first configuration comprises the global optimum configuration for allocating resources; and
wherein accepting the second configuration comprises accepting the second configuration if the first value is lower than the second value based on a second probability that the first configuration does not comprise the global optimum configuration for allocating resources.

15. The method of claim 1, wherein the first and second probabilities comprise first and second variable probabilities, the method further comprising determining the first and second variable probabilities based on the number of remaining potential configurations.

16. The method of claim 1, wherein the first and second probabilities comprise first and second variable probabilities, the method further comprising determining the first and second variable probabilities based on the degree of optimization of a previously generated configuration.

17. An article of manufacture comprising:
a computer readable memory;
a routine stored on the computer readable memory and adapted to be executed on a processor to generate a first configuration for allocating resources having a first degree of optimization;
a routine stored on the computer readable memory and adapted to be executed on a processor to generate a second configuration for allocating resources based on a variation of the first configuration, the second resource allocation configuration having a second degree of optimization;
a routine stored on the computer readable memory and adapted to determine if the second configuration, based on the first configuration, meets minimum configuration restraints and to determine if the second configuration does not meet the minimum configuration restraints but is to be kept;
a routine stored on the computer readable memory and adapted to be executed on a processor to reject the second configuration if the first degree of optimization represents a more optimal configuration than the second degree of optimization based on a first probability that the first configuration comprises a global optimum configuration for allocating resources; and a routine stored on the computer readable memory and adapted to be executed on a processor to accept the second configuration if the first degree of optimization represents a more optimal configuration than the second degree of optimization based on a second probability that the first configuration does not comprise the global optimum configuration for allocating resources.

18. The article of manufacture of claim 17, further comprising:

a routine stored on the computer readable memory and adapted to be executed on a processor to generate a third configuration for allocating resources based on a variation of the first configuration if the second configuration does not comprise a minimum configuration threshold; and a routine stored on the computer readable memory and adapted to be executed on a processor to generate a fourth configuration for allocating resources based on a variation of the first configuration if the second configuration does not comprise the minimum configuration threshold based on a third probability that a configuration other than the second configuration will comprise the minimum configuration threshold.

19. The article of manufacture of claim 17, further comprising:

a routine stored on the computer readable memory and adapted to be executed on a processor to compare the second degree of optimization to a degree of optimization according to the most optimal configuration among previously generated configurations;

a routine stored on the computer readable memory and adapted to be executed on a processor to reject the second degree of optimization if the degree of optimization according to the most optimal configuration represents a more optimal configuration than the second degree of optimization; and a routine stored on the computer readable memory and adapted to be executed on a processor to accept the second degree of optimization if the second degree of optimization represents a more optimal configuration than the degree of optimization according to the most optimal configuration.

20. The article of manufacture of claim 17, wherein the routine to generate a second configuration for allocating resources based on a variation of the first configuration comprises a routine stored on the computer readable memory and adapted to be executed on a processor to generate the second configuration for allocating resources based on a genetic variation of the first configuration.

* * * * *